June 20, 1933.  A. S. HOWELL  1,915,262
MOTION PICTURE AND SOUND RECORD BEARING
FILM AND METHOD OF PRODUCING SAME
Filed June 25, 1930
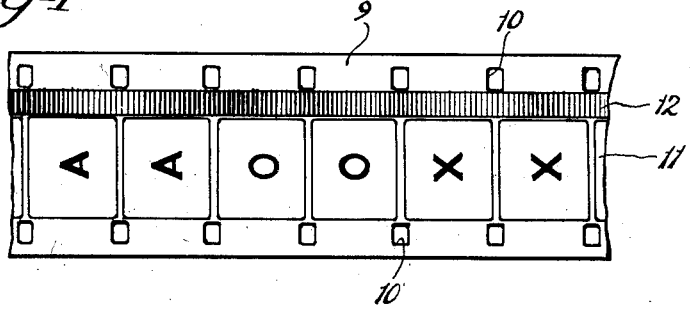
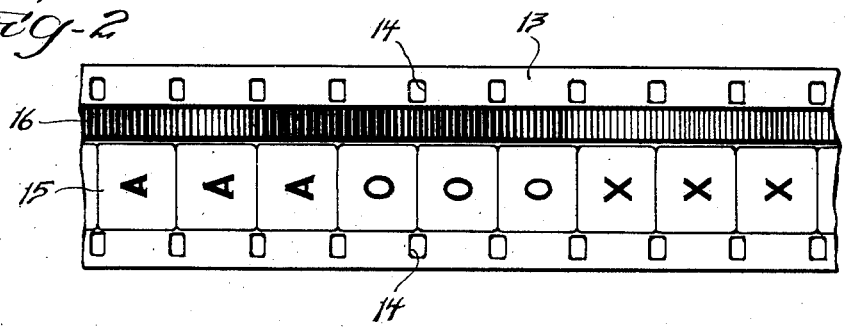
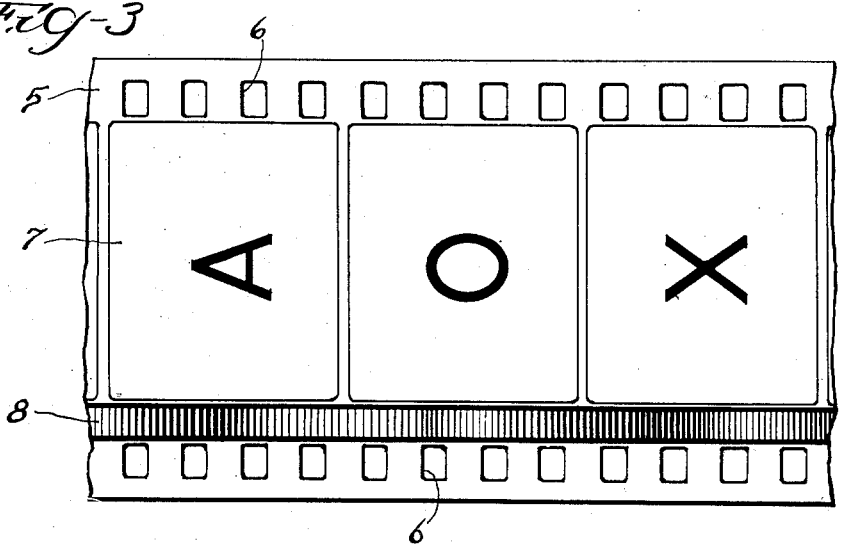
Inventor
Albert S. Howell Patented June 20, 1933

1,915,262

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

MOTION PICTURE AND SOUND RECORD BEARING FILM AND METHOD OF PRODUCING SAME

Application filed June 25, 1930. Serial No. 463,656.

My invention has for its object the provision of an improved motion picture and sound record bearing film which is well adapted for improved sound reproduction and picture projection, all with a view toward a satisfactory sound reproduction and picture projection from smaller motion picture and sound record bearing film than is at present used with satisfactory results, and particularly with reference to the placing of motion picture and sound records upon standard 16 mm. film or film of small size with satisfactory sound reproduction and picture projection therefrom.

The invention will be better understood by reference to the accompanying drawing in which—

Figure 1 is an enlarged face view of a standard 16 mm. motion picture film provided with picture and sound record bearing sections involving my invention;

Figure 2 is an enlarged face view of another small size film involving my invention; and, Figure 3 is an enlarged face view of a standard 35 mm. film bearing standard picture and sound record sections.

Like characters of reference indicate like parts in the several views.

Referring to Figure 3, showing a standard 35 mm. picture and sound record bearing film, this film, designated at 5, is provided with standard marginal feed perforations 6 between which lie the picture bearing section 7 and the sound record section 8 both of standard width, the picture section 7 having successive pictures of standard width and height proportions and bearing the characters A, O and X to designate the differences between the pictures which in projection give the effect of motion.

The proportions of the standard 35 mm. motion picture and sound record bearing film are such that reasonably satisfactory results both in picture projection and sound reproduction are obtainable therefrom. However, a reduction of the proportions of the picture and sound record bearing sections of this film to correspond with a smaller film, say a standard 16 mm. film, is unsatisfactory particularly in the reproduction of sound, for the sound record section thereof is too narrow and too contracted lineally of the film for satisfactory sound reproduction. The picture projection suffers also in that the pictures on the film are too small, considerably smaller than the standard pictures of "silent" 16 mm. standard film, so that the granular characteristic of the emulsion of the film interferes with the desired magnification in the picture projection.

Referring to Figure 1, a standard 16 mm. motion picture film is designated at 9, and is provided with standard marginal feed perforations 10 which, it will be observed, are spaced equal to the height of the standard picture spaces of this film. The picture section of this film is designated at 11 and the sound record section thereof is designated at 12, their width proportions being different from the standard width proportions of the picture and sound record bearing sections of the film 5, as will be hereinafter described.

In accordance with my invention, I place the picture and sound records on the standard 16 mm. film 9 in the following manner.

The pictures are placed on this film in duplicate succeeding pictures of standard 16 mm. film picture spacing, as indicated by the pictures of Figure 1 bearing the characters A, O and X, and these pictures are of standard height and width proportions but are disproportionately reduced so that the width thereof is less than that of the proportionate reduction of the picture width of the standard 35 mm. sound and picture film to standard 16 mm. film.

Each pair of these duplicate succeeding pictures is the equivalent of one of the picture spaces of the 35 mm. film and, lineally of the film, approximates the height of a picture space of the 35 mm. film, the operating speed of the 16 mm. film consequently approximating the operating speed of the 35 mm. film to effect the same speed of motion of the projected picture.

As illustrated in Figure 1, showing the invention as preferably applied on standard 16 mm. film, the standard picture spacing is .300″ resulting in double the picture spacing being .600". The picture spacing of standard 35 mm. film is .748", so that the operating speed of the 16 mm. film bears a proportion to that of the 35 mm. film of 600 to 748, thus approximating the operating speed of the 35 mm. film.

In order that the sound record of the section 12 of the standard 16 mm. film 9 synchronize with the pictures on this film, it is applied thereon considering each pair of duplicate pictures thereon as one picture. Accordingly, the sound record on the 16 mm. film is extended lineally of the film disproportionately to the proportions of the 16 mm. and 35 mm. films.

Thus, as compared with the 35 mm. film 5 of Figure 3, the sound record of the 16 mm. film 9 of Figure 1 bears, lineally of the film, a proportion of 600 to 748, the proportion which the operating speed of the 16 mm. film bears to that of the 35 mm. film, as determined by the proportion which the lineal extent of the film embraced by a pair of picture spaces of the 16 mm. film bearing duplicate or identical pictures bears to a picture space of the 35 mm. film.

Thus, the sound record of the 16 mm. film is not reduced lineally of the film in the proportion which the small film bears to the large film, but is extended lineally of the small film disproportionately, and, as shown in Figure 1, approximates the lineal extent of the sound record of the large film with the result that the sound record is not contracted lineally to an extent which would be detrimental to satisfactory sound reproduction.

As aforesaid, the pictures of the 16 mm. film 9 of Figure 1 are reduced disproportionately to the proportions of the small and large films so that the width of the picture record section 11 of the film 9 is disproportionately narrow. Accordingly, this permits of the sound record section 12 of the film 9 being disproportionately wide with the result that the width of the sound record section 12 is increased disproportionately to the proportions of the small and large films, and, as shown in Figure 1, the width of the sound record section 12 of the film 9 bears the same proportion to the width of the sound record section 8 of the film 5 as the lineal extent of the section 12 bears to the section 8, namely, 600 to 748, thus providing the sound record section 12 of a width adequate for satisfactory sound reproduction.

The pictures of the picture record section 11 of the film 9 are of course smaller than those of a "silent" 16 mm. film, but due to the fact that the pictures of the picture record section 11 are pluralities of identical pictures the displacement of the grains of the emulsion in the several pictures projected at the correspondingly higher speed tends to permit of a higher magnification of the projected pictures.

Referring to Figure 2, a non-standard film of 16 mm. width is designated at 13 and is provided with marginal feed perforations 14 which are spaced so that the picture spacing of the standard 35 mm. film 5 of Figure 3 is a multiple thereof, in this case the multiple being three, the spacing of the feed perforations 14 being equal to the picture spacing of this film 13. The picture section of this film is designated at 15 and the sound record section thereof is designated at 16, their width proportions being different from the standard width proportions of the picture and sound record bearing sections of the film 5, as will be hereinafter described, and for the same purposes as previously described with reference to the standard 16 mm. film 9 of Figure 1.

The pictures are placed on this film 13 in sets of three identical succeeding pictures, as indicated by the pictures of Figure 2 bearing the characters A, O and X, and these pictures are of standard height and width proportions but are disproportionately reduced so that the width thereof is less than that of the proportionate reduction of the picture width of the standard 35 mm. sound and picture film to a 16 mm. film.

Each three of the picture spaces of this film 13 equals in extent lineally of the film one of the picture spaces of the 35 mm. film, the operating speed of this 16 mm. film consequently equaling the operating speed of the 35 mm. film to effect the same speed of motion of the projected picture.

Accordingly, the sound record of the section 16 of the film 13 is extended lineally of the film disproportionately to the proportions of the 16 mm. and 35 mm. films and equals in lineal extent that of the 35 mm. film in that three picture spaces of the film 13 equal one picture space of the 35 mm. film.

The picture section 15 of the film 13 being reduced disproportionately to the proportions of the small and large films results in the width of the picture section 15 being disproportionately narrow and to such an extent that the width of the sound record 16 equals that of the sound record 8 of the 35 mm. film 5 just as the extent of the sound record 16 lineally of the film equals that of the sound record 8.

Both of the films 9 and 13 with the picture and sound records thereon attain the same advantages in the same manner, as will be observed, the film 9 being preferred from a practical standpoint in that the film is standard with consequently decrease in necessary changes of apparatus of existing design in adapting them for this use, and the film 13 being preferred from theoretical standpoint in that three of the picture spaces of this film equal in extent lineally of the film one of the picture spaces of the 35 mm. film with the result that the operating speed of the film 13, is the same as that of the 35 mm. film and the sound record sections thereof are of the same extent lineally of the films while the width of these sound record sections are preferably the same.

The method of my invention by which the films of my invention are produced from standard 35 mm. sound and picture film is as follows:—

The pictures of the 35 mm. film are successively printed by reduction printing upon the small film, each picture of the 35 mm. film being printed on the requisite number of succeeding picture spaces, as by advancing the 35 mm. film but once for the requisite number of advance movements and exposures of the small film, and the sound record of the 35 mm. film is printed upon the small film with the films operating at relative speeds proportionate to their operating speeds, reduction printing being employed where necessary as in the case of the printing of the standard 16 mm. film of Figure 1 from the 35 mm. film 5 of Figure 3.

While I have herein shown and particularly described my invention I do not wish to be limited to the precise details thereof herein described as changes may be readily made without departing from the spirit of my invention, but having thus described my invention I claim as new and desire to secure by Letters Patent the following:—

1. A motion picture and sound record bearing film having the picture record thereof comprising equal pluralities of identical succeeding pictures of standard height and width proportions and of a width less than that of a picture having the standard proportion to the film width, and having the sound record thereof synchronized with said pictures and of a width greater than that of a sound record bearing section having the standard proportion to the film width.

2. A motion picture and sound record bearing film having the picture record thereof comprising equal pluralities of identical succeeding pictures of standard height and width proportions, and having the sound record thereof synchronized with said pictures, said picture record being disproportionately narrow as compared with a picture proportional to the width of the film and having standard height and width proportions and said sound record having a width disproportionately wide and approximating the width of a sound record having the standard proportion to a picture of standard height and width proportions and of a height equal to the spacing of said pictures multiplied by the number of one of said pluralities of identical succeeding pictures.

3. A motion picture and sound record bearing film of 16 mm. width having the picture record thereof comprising equal pluralities of identical succeeding pictures of standard 35 mm. sound and picture film height and width proportions and having the width thereof less than that of the proportionate reduction of the picture width of said standard 35 mm. sound and picture film to the 16 mm. film, and having the sound record synchronizing with said pictures and of a width greater than the proportionate reduction of the sound record width of standard 35 mm. sound and picture film.

4. A motion picture and sound record bearing standard 16 mm. film having the picture record thereof comprising duplicate succeeding pictures of standard 35 mm. sound and picture film height and width proportions and having the width thereof less than that of the proportionate reduction of the picture width of said standard 35 mm. sound and picture film to said standard 16 mm. film, and having the sound record thereof synchronizing with said pictures and of a width greater than the proportionate reduction of the sound record width of said standard 35 mm. sound and picture film and approximately the width of said sound record of said standard 35 mm. sound and picture film.

5. The method of printing from a large motion picture and sound record bearing film upon a small film which consists in printing each picture of the large film in reduced size on a plurality of succeeding picture spaces of the small film, and printing the sound record of the large film on the small film in a lineal extent synchronizing with said pictures printed thereon.

6. The method of printing from a large motion picture and sound record bearing film upon a small film which consists in printing each picture of the large film on a plurality of succeeding picture spaces of the small film in reduced size less than that of a proportionate reduction from the large film to the small film, and printing the sound record of the large film on the small film in a lineal extent synchronizing with said pictures and of a width proportionate to said extent.

7. The method of printing from a large motion picture and sound record bearing film upon a smaller film which consists in printing each picture of the large film on a plurality of succeeding spaces of the small film in reduced size such that the distance longitudinally of the film embraced by one of said pluralities of identical pictures approximates the height of one picture of the large film, and printing the sound record of the large film on the small film in a lineal extent to synchronize with the pictures thereof and of a width proportionate to such extent.

8. The method of printing from a standard 35 mm. motion picture and sound record bearing film upon a standard 16 mm. film which consists in printing each picture of the 35 mm. film on two succeeding picture spaces of the 16 mm. film in reduced size smaller than the proportion which the 16 mm. film bears to the 35 mm. film, and printing the sound record of the 35 mm. film on the 16 mm. in a lineal extent to synchronize with the pictures thereof and of a width proportionate to such extent.

In witness whereof I hereunto affix my signature this 20th day of June 1930.

ALBERT S. HOWELL.